United States Patent [19]

Riech et al.

[11] 4,381,152

[45] Apr. 26, 1983

[54] DIMENSION MEASURING APPARATUS

[75] Inventors: Volker Riech; Dietrich Sorgenicht, both of Leverkusen, Fed. Rep. of Germany

[73] Assignee: Daystrom Limited, Gloucester, England

[21] Appl. No.: 152,008

[22] Filed: May 20, 1980

[30] Foreign Application Priority Data

May 21, 1979 [DE] Fed. Rep. of Germany ....... 2920530
May 21, 1979 [DE] Fed. Rep. of Germany ....... 2920531

[51] Int. Cl.³ ............................................. G01B 11/10
[52] U.S. Cl. .................................... 356/385; 356/429; 250/560
[58] Field of Search ............... 356/384, 385, 386, 429; 250/560

[56] References Cited

U.S. PATENT DOCUMENTS

| | | | |
|---|---|---|---|
| 3,187,185 | 6/1965 | Milnes | 250/222 R |
| 3,565,531 | 2/1971 | Kane et al. | 250/560 |
| 3,874,798 | 4/1975 | Antonsson et al. | 250/560 |
| 3,947,129 | 3/1976 | Wiklund | 356/429 |
| 4,067,652 | 1/1978 | Bohlander | 250/560 |

FOREIGN PATENT DOCUMENTS

| | | |
|---|---|---|
| 1084035 | 6/1960 | Fed. Rep. of Germany . |
| 2104893 | 8/1972 | Fed. Rep. of Germany . |
| 2127751 | 12/1972 | Fed. Rep. of Germany . |
| 2140939 | 3/1973 | Fed. Rep. of Germany . |
| 2819395 | 5/1979 | Fed. Rep. of Germany . |
| 52-37063 | 3/1977 | Japan .................................. 356/385 |

Primary Examiner—R. A. Rosenberger
Attorney, Agent, or Firm—Dale Gaudier

[57] ABSTRACT

A width gauge for measuring the width of self-radiating (i.e. hot) rolled material comprises a camera containing two linear arrays of photodiodes, the camera being arranged to produce on each array an image of a respective one of the edges of the material. To avoid problems in detecting the edges caused by dark spots which may be produced on the material by slag or uneven cooling, both arrays are scanned from the less illuminated end of the array to the more illuminated end.

Other embodiments employ multi-camera arrangements to improve accuracy and/or correct errors due to changes in the position of the material, and a further embodiment employs a monochromatic light source to back-light the material and a filter in the camera matched to the light source.

4 Claims, 6 Drawing Figures

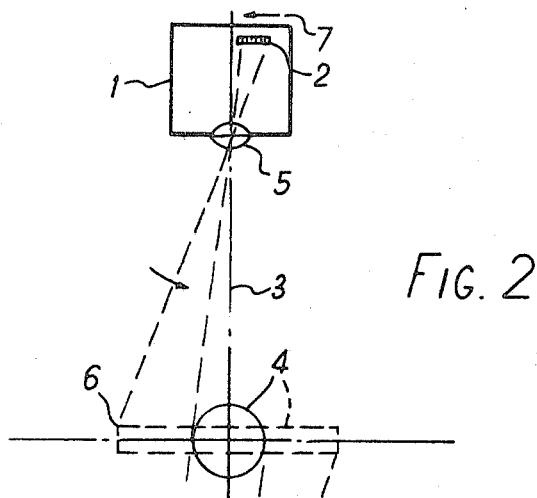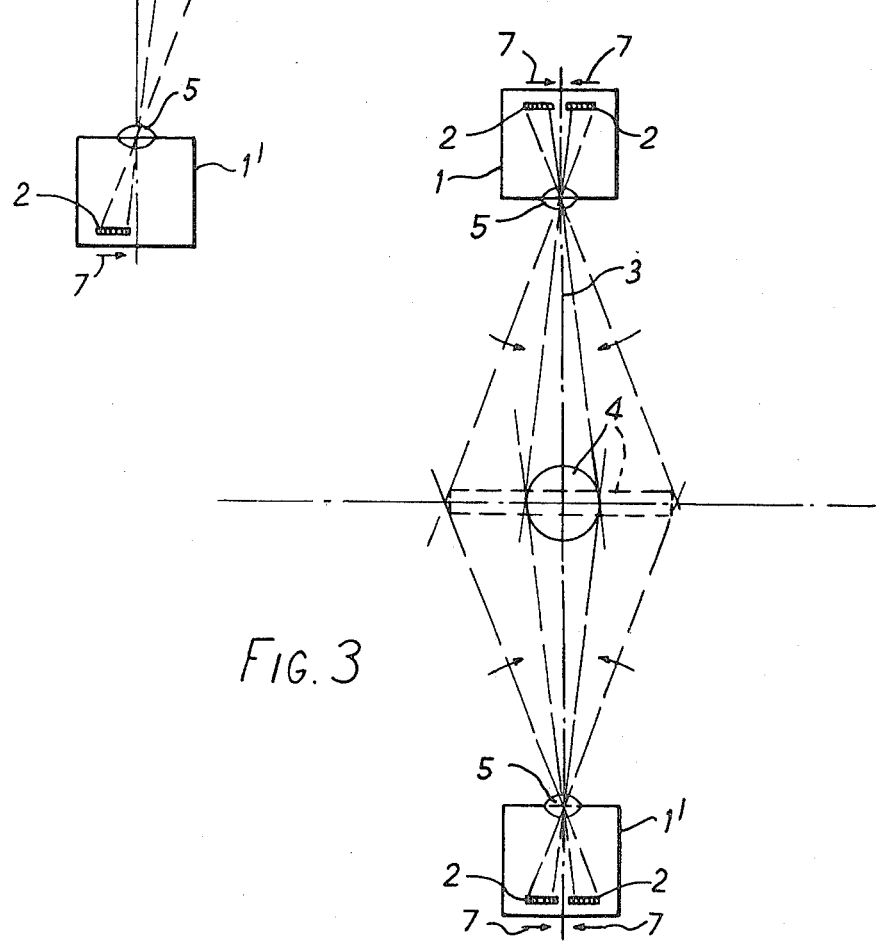

DIMENSION MEASURING APPARATUS

This invention relates to apparatus for measuring the position of the edge of an object or the distance between two opposite edges of an object. The invention is more particularly, but not exclusively, concerned with apparatus for measuring the width or diameter of hot (and therefore luminous) moving strip-, rod- or tube-like material as it is being produced.

Apparatus of this general type is described, for example, in German Patent Specification No. OLS 21 40 939, according to which the material whose width is to be measured is illuminated from behind by a source of collimated light so as to project an image of the material on to a row of photodiodes disposed on the opposite side of the material to the light source. However, this apparatus suffers from various disadvantages. For example, the light source must usually be very bright, and therefore tends to age quickly, to be relatively expensive and to have a short life. Additionally, the operation of the apparatus is adversely affected by the presence of light not from the source, eg ambient light and/or light emitted by the material itself if the material is hot. Further, the light source may have dark spots, eg because of dirt deposited thereon, which can be confused with an edge of the material. Alternatively, if the material is sufficiently hot that it emits enough light for the light source to be dispensed with, then dark spots on the material, due for example to the presence of slag or cooling water, can also be confused with an edge of the material.

It is an object of the present invention in its various aspects to alleviate at least some of the abovementioned disadvantages.

According to a first aspect of the present invention, there is provided apparatus for measuring the distance between two opposite edges of an object, the apparatus comprising a camera containing two rows of photosensitive devices and arranged, in use, to produce on each row of devices an image of a respective one of said edges, each row of devices being associated with scanning means arranged to scan the devices, from the less illuminated end of the row to the more illuminated end, to determine the position therealong of said image and thereby determine the position of the corresponding edge of the object.

According to a second aspect of the invention, there is provided apparatus for measuring the distance between two opposite edges of an object, the apparatus comprising first and second cameras arranged to be disposed, in use, on opposite sides of the object with their optical axes substantially aligned and substantially perpendicular to the distance to be measured, each camera containing a respective row of photosensitive devices on which the camera produces, in use, an image of a respective one of said edges, and each row of devices being associated with scanning means arranged to scan the devices, from the less illuminated end of the row to the more illuminated end, to determine the position therealong of said image and thereby determine the position of the corresponding edge of the object.

Thus in each of the first two aspects of the invention, the respective positions of both edges of the object are detected using a dark-to-light illumination transition. The aforementioned dark spots will therefore be much less likely to adversely affect the measurement, since each edge will nearly always be detected before the scanning reaches the dip in illumination level caused by such a spot. It will be appreciated that if the measurement is effected by making a single scan across a complete image of the object, as in the prior art, so that one edge is detected using a light-to-dark transition, such a spot could fairly readily be mistaken for an edge.

According to a third aspect of the invention, there is provided apparatus for sensing the position of the edge of an object which may emit light, the apparatus comprising a camera containing a row of photosensitive devices on which the camera produces, in use, an image of said edge, and means for scanning the row of devices to determine the position therealong of said image and thereby determine the position of said edge, further comprising a substantially monochromatic light source disposed on the opposite side of the object to the camera, said light source being chosen to produce light of a different wavelength from that expected to be emitted by the object, and an optical band pass filter disposed between the object and the camera, and arranged preferentially to transmit light of the wavelength produced by the light source.

The invention will now be described, by way of example only, with reference to the accompanying drawings, of which:

FIGS. 2 and 4 are simplified diagrammatic illustrations of three further embodiments of width measuring apparatus in accordance with the present invention, each using two cameras;

The different embodiments have various parts in common: these common parts bear the same reference numbers in all of the accompanying drawings.

Figure 1:
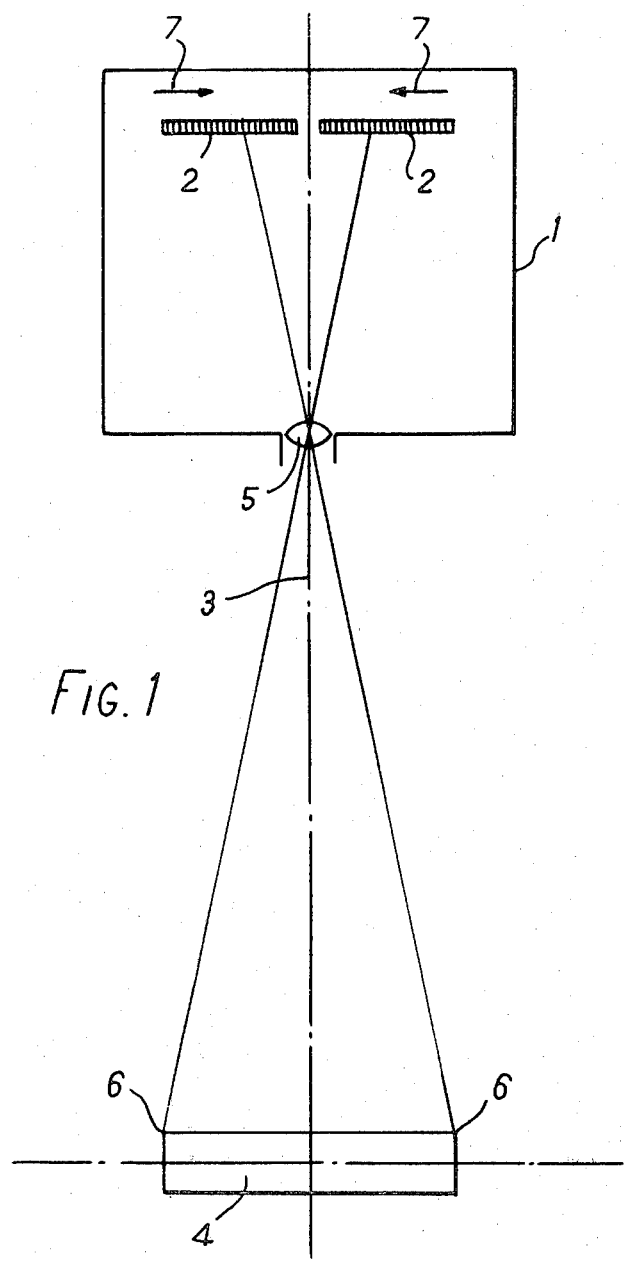
FIG. 1 is a simplified diagrammatic illustration of one embodiment of width measuring apparatus in accordance with the present invention, using a single camera.

The width measuring apparatus of FIG. 1 comprises a camera 1 in which two linear arrays of photosensitive devices, constituted by two diode lines 2, are arranged substantially symmetrically with respect to the optical axis 3 of the camera. An image of a moving luminous strip of rolled material 4 whose width is to be measured is projected by the optical system 5 of the camera 1 onto the two diode lines 2, which are arranged in alignment with each other and extend perpendicularly to the edges 6 of the material which are to be used for the measurement (ie parallel to the direction of the width being measured) such that an image of a respective edge of the material is formed on each diode line. Each of the diode lines 2 is scanned in the direction of the arrow 7, ie in each case from the end of the respective diode line remote from the optical axis 3. The scanning and evaluating electronic circuits for the diode lines 2 are not illustrated, since their precise form is not relevant to the present invention: however suitable circuits are described in German Patent Specification No. OLS 25 16 756, and include a trigger circuit which is used to find the edges 6. The amplitudes of the video signals from the diode lines 2 are regulated to a substantially constant value for both of the lines with a common amplitude control circuit, ie a nominal amplitude value for the video signals is set in advance, and is compared to the actual amplitude value of the video signals from one diode line 2, the exposure time for both of the diode lines 2 being determined from the comparison value.

In order to find each of the edges 6, a transition from dark to light in the material 4 is made use of on the respective diode line 2. Thus the width of the material 4 may be measured without the use of any source of rear illumination, and the positions of both edges of the material are exactly determined via the aforementioned trigger circuit. Interference effects caused by slag or water on the material 4 are to a large extent eliminated, since the first sudden dark to light transition at each edge 6 is used for the measurement in each case.

An integration time for the exposure of the diode lines 2 of approximately 2–40 ms may be used for the measurement, depending upon the amount of light being emitted by the material 4, so that interference effects resulting from limited areas of slag at the edges 6 of the material are to large extent averaged out (since the measurement is carried out on moving material). Even if there is slag on the material 4, adaptation of the time for which the diode lines 2 are exposed to the intensity of radiation during the measuring operation remains substantially unaffected. FIG. 2 shows an embodiment of the invention comprising two cameras 1, 1' disposed on opposite sides of the material 4 and having a common optical axis 3, with respect to which a diode line 2 is arranged symmetrically in each of the cameras 1, 1'. Thus in this embodiment, the diode lines 2 are disposed on opposite sides of the common optical axis 3, and each one determines the position of a respective one of the edges 6 of the material 4: the material 4 is shown in FIG. 2 as being capable of having either a round or a rectangular profile. This results in the ability to effect substantial compensation for measurement errors caused by changes in the position of the material 4 during the measurement, so that considerable variations in the position of the material can be tolerated (within certain limits) without any significant resultant errors in the measurement.

The embodiment of the invention shown in FIG. 3 differs from that of FIG. 2 only in that, instead of one diode line 2 in each camera 1, 1', two diode lines 2 are used, as was the case with the camera 1 of FIG. 1. This enables the camera signals to be averaged by suitable electronic evaluation, with the result that measuring errors are further reduced.

Figure 4:
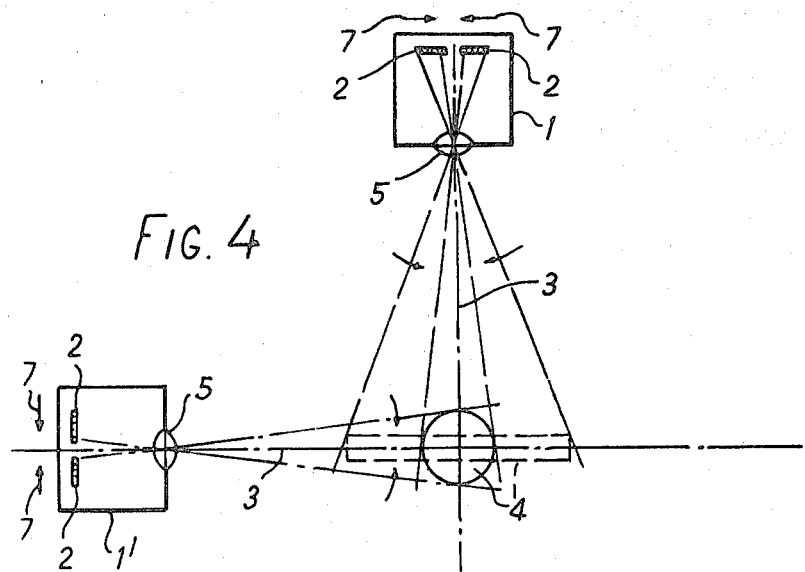

In the case of the embodiment of the invention shown in FIG. 4, the two cameras 1, 1' of FIG. 3 are arranged with their optical axes 3 at right-angles to one another, in which case the asymmetry of the video signals from the diode lines 2 of the camera 1', caused by an asymmetrical position of the material 4 for measurement with respect to the optical axis of the camera 1', can be used to correct by computation the width measurement performed by the camera 1.

Figure 5:
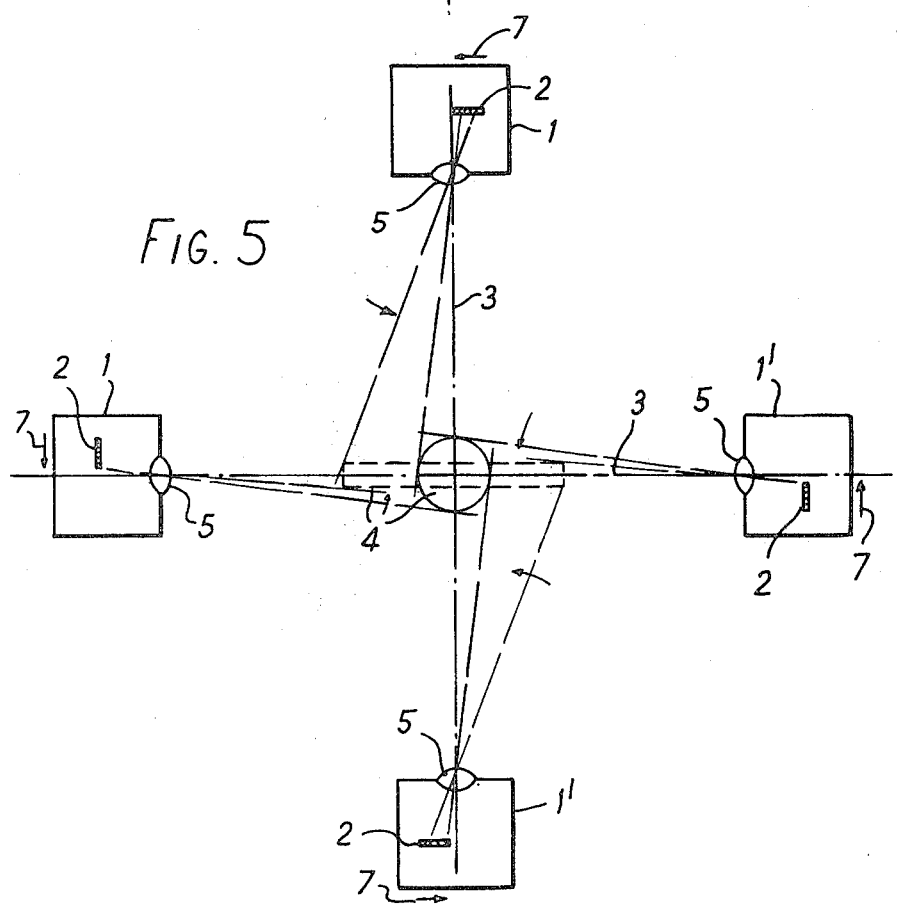
FIG. 5 is a simplified diagrammatic representation of yet another embodiment of width measuring apparatus in accordance with the present invention, this time using four cameras.

In the embodiment of the invention illustrated in FIG. 5, there are two pairs of cameras 1, 1', each pair of cameras 1,1' having a common optical axis 3, and the two common optical axes 3 being perpendicular to one another. Each camera 1,1' is provided with a single diode line 2 arranged as in the FIG. 2 embodiment. In this case, each pair of opposed cameras 1,1' determines the distance between a respective pair of opposed edges of the material 4, the use of two camera systems at right-angles to one another enabling those measuring errors which are caused by changes in the position of the material to be corrected by computation. In this connection, two dimensions of the material 4, which dimensions are directed at right-angles to one another, can be determined, and additional significant automatic compensation can be obtained for measuring errors caused by changes in the position of the material 4. The advantages of the embodiments of FIGS. 2 and 4 are thus combined.

Figure 6:
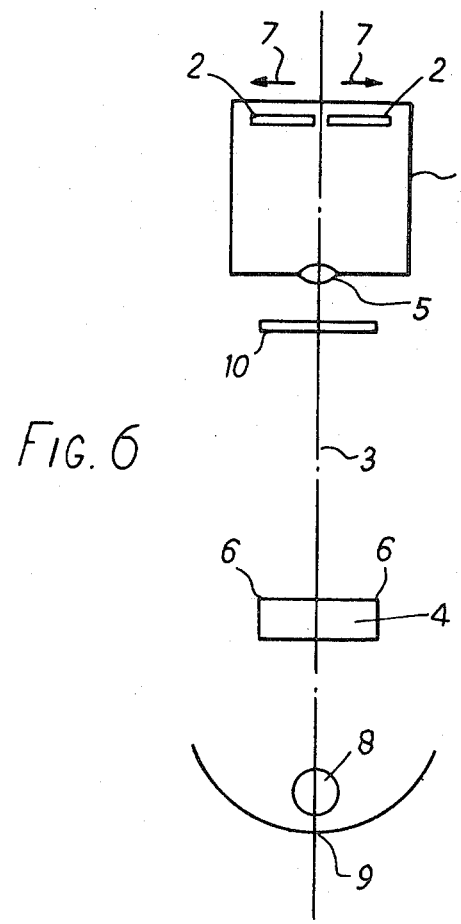
FIG. 6 is a simplified diagrammatic representation of another single-camera embodiment of width measuring apparatus in accordance with the present invention.

The embodiment of the invention shown in FIG. 6 can be used with nonluminous material 4 as well as with luminous material, since it comprises, on the side of the material remote from the camera 1, a high intensity, substantially monochromatic light-source 8, constituted by a low-pressure sodium-vapour lamp, which serves to illuminate the material from behind. In order to make better use of the light-source 8, a curved reflector 9 is arranged behind it, so that practically all the light radiated by the light-source is guided in the direction of the material 4. Between the camera 1 and the material 4, and preferably in or closely adjacent to the camera, there is furthermore provided an optical band-pass filter 10, for instance a narrow-band filter. Such a filter typically works on the interference principle, and for example may be a "quarter wave" filter. Thus the use of a low-pressure sodium-vapour lamp as the light-source 8, accompanied by the use of such a band-pass filter 7, allows practically only light of the sodium-d/D line to pass through.

It will be noticed that because the material 4 is backlit in the FIG. 6 embodiment, the direction of scanning of the diode lines 2 is reversed, to ensure that the respective positions of the edges 6 of the material are still detected using dark to light transitions.

Because of the high intensity of a low-pressure sodium-vapour lamp contamination in the optical transmission path between the light-source 8 and the diode line 2, for instance in the form of water vapour or oil vapour in the region of the material 4, is not likely to impair illumination of the diode line up to saturation, while on the other hand external light, whether from the material 4 if for example the material is luminous rolled material or a material with a bright metallic surface, or otherwise incident light, is effectively suppressed.

In addition, the life of a sodium-vapour lamp is very long, and it can be operated from the normal 50 or 60 Hz mains voltage without any great expense, in which case integration times of 10 ms or 8.3 msec respectively can be used for the diode line to substantially eliminate any ripple-induced fluctuations in the intensity of the light at twice the mains frequency.

The high intensity of radiation from low-pressure sodium-vapour lamps also enables smaller diodes, which can nevertheless be illuminated up to saturation, to be used for the diode line, so that greater accuracy of measurement can be achieved.

The use of a low-pressure sodium-vapour lamp as the light source is also especially suitable because the maximum spectral sensitivity of the diodes of the diode lines lies in the red region, which is adjoined by the light of the low-pressure sodium-vapour lamp, so that to this extent also no problems are involved in illuminating the diode line up to saturation.

If the width of luminous material is to be measured using a monochromatic light source other than a sodium-vapour lamp, care should be taken to ensure that no monochromatic light falling in the radiation region of the material should be used in order that external light may be effectively suppressed, ie in the case of rolled material no monochromatic light in the red region should be used, since rolled material radiates in this region.

Because a sodium-vapour map can provide relatively uniform illumination, the two diode lines 2 of FIG. 6 can if desired be replaced by a single diode line scanned from end to end.

To avoid errors due to variations in the thickness of the material, the camera 1 can be offset so that its optical axis is outside the width of the material 4, so that it is the image of the lower edge of the material which is being scanned: it will be appreciated that the height of the camera 1 above the lower surface of the material 4 is fixed.

Various other modifications can be made to the described embodiments of the invention. For example, the diode lines 2 can be replaced by linear arrays of other kinds of photosensitive devices, for example charge-coupled devices.

We claim:

1. Apparatus for measuring the distance between two opposite edges of a luminous object, the apparatus comprising first and second cameras arranged to be disposed, in use, on opposite sides of the object with their optical axes substantially aligned and substantially perpendicular to the distance to be measured, each camera containing a respective row of photosensitive devices on which the camera produces, in use, an image of a respective one of said edges, the rows of devices being symmetrically disposed on each side of the common optical axis, and each row of devices being associated with scanning means capable of scanning the devices from the end of the row remote from the common optical axis to the end of the row nearer to the common optical axis, to determine the position therealong of said image and thereby determine the position of the corresponding edge of the object.

2. Apparatus as claimed in claim 1, further comprising comparison means for comparing the value of the signals produced by the illuminated devices of one of the cameras with a reference level and for adjusting the exposure time of both rows in dependence upon the result of said comparison.

3. Apparatus as claimed in claim 1 or claim 2, comprising third and fourth cameras similar to the first and second cameras and also arranged to be disposed, in use, on opposite sides of the object with their optical axes substantially aligned, the common optical axis of the third and fourth cameras being substantially perpendicular to the common axis of the first and second cameras and substantially parallel to the distance to be measured.

4. Apparatus for sensing the position of the edge of an object which may emit light, the apparatus comprising a camera containing a row of photosensitive devices on which the camera produces, in use, an image of said edge, and means for scanning the row of devices to determine the position therealong of said image and thereby determine the position of said edge, further comprising a substantially monochromatic light source disposed on the opposite side of the object to the camera, said light source comprising a low-pressure sodium-vapor lamp, and an optical band pass filter of the narrow-band, interference type disposed between the object and the camera, and arranged preferentially to transmit light of the wavelength produced by the light source, and wherein the low-pressure sodium-vapor lamp is adapted to be energized by the normal alternating mains supply voltage, and the scanning means is arranged to scan the row of devices at intervals of approximately T seconds, where T is half the period of said normal alternating mains supply voltage.

* * * * *